Dec. 6, 1960 P. W. THORNHILL 2,963,175
BUFFERS FOR RAILWAY, TRAMWAY AND LIKE VEHICLES
Filed May 7, 1958
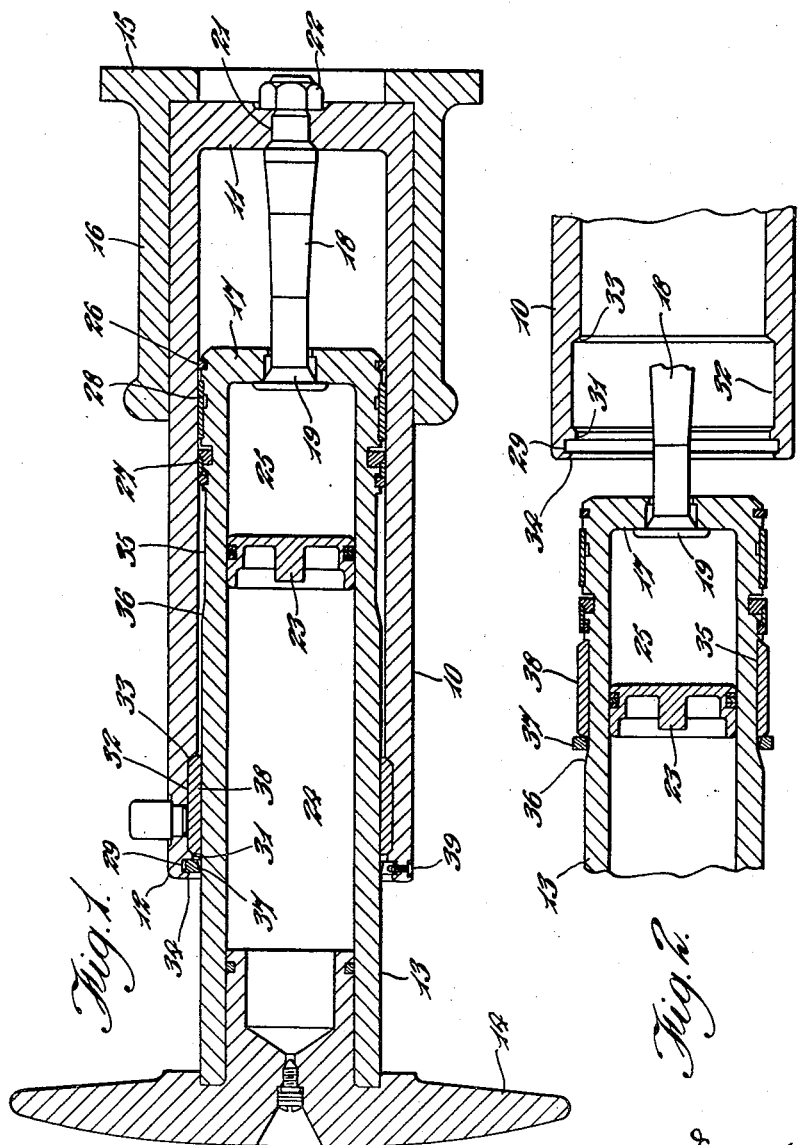

United States Patent Office 2,963,175
Patented Dec. 6, 1960

2,963,175

BUFFERS FOR RAILWAY, TRAMWAY AND LIKE VEHICLES

Peter Warborn Thornhill, Kenilworth, England, assignor to Oleo-Pneumatics Limited, Kenilworth, England Filed May 7, 1958, Ser. No. 733,600

Claims priority, application Great Britain May 16, 1957

5 Claims. (Cl. 213—223)

This invention relates to shock absorbing units for use on railway vehicles to absorb impact shocks during shunting and/or to provide a resilient draft connection between the vehicles during running. Such shock absorbing units include the commonly used buffers, and also resilient units embodied in draft couplings by which the vehicles are coupled together. The invention relates to shock absorbing units of the kind in which a stem is slidable in a guide, inward movement of the stem being resisted by a spring or other shock absorbing means, such as liquid pressure damping mechanism.

In such shock absorbing units it is usually necessary to provide, at the open end of the guide, annular members such as bearing sleeves or bushes, packings or scraper rings through which the stem slides, and such annular members must be held against axial movement relative to the guide.

The object of the present invention is to provide an improved arrangement of such shock absorbing units in which one or more annular members is or are securely located in the guide without the use of costly retaining means.

According to the invention, in a buffer or equivalent shock absorbing unit for railway, tramway or like vehicles comprising a stem extending into one end of a tubular guide through a split annular member mounted in the said guide, the tubular guide is formed with an internal circumferential groove to receive the annular member, and the stem is formed with a portion of reduced diameter which, when the buffer is assembled, remains permanently on the inner side of said groove, the said portion of reduced diameter being connected to the full diameter surface of the stem projecting from the guide by a frusto-conical portion, so that the annular member can be assembled on the reduced-diameter portion of the stem, inserted into the guide whilst in that position until it engages a stop locating it opposite its groove, and expanded into the groove by further inward movement of the stem.

The groove in the guide which receives the split annular member is preferably bounded at its side nearer to the open end of the guide by a wall of less depth than that at its other side, so that the split annular member, when engaging the reduced portion of the stem, passes freely into the guide until it comes opposite to its groove, and is stopped by the deeper wall thereof.

Further, according to the invention, in a buffer or equivalent shock absorbing unit for railway, tramway or like vehicles comprising a stem extending into one end of a tubular guide through a scraper ring and a bearing sleeve mounted in the said guide the scraper ring and the bearing sleeve are both split annular members and are each accommodated in a circumferential groove in the guide, the stem being formed with a portion of reduced diameter which, when the buffer is assembled, remains permanently on the inner side of said grooves, the said portion of reduced diameter being connected to the full-diameter surface of the stem which projects from the guide by a frusto-conical portion, so that the scraper ring and bearing sleeve can be assembled on the reduced-diameter portion of the stem, and inserted into the guide whilst in that position until each of them engages a stop locating it opposite its groove, the said scraper ring and bearing sleeve being then expanded into their respective grooves by further inward movement of the stem.

The invention is hereinafter described with reference to the accompanying drawings, in which:

Figure 1 is a longitudinal section through a railway buffer embodying the invention; and Figure 2 shows the positions of the parts when the stem is about to be assembled with the guide.

Referring to the drawings, the buffer comprises a cylindrical guide member 10 closed at one end by an integral wall 11 and open at its other end 12, a tubular stem 13 slidably mounted in the guide member 10 carrying a buffer head 14 at its end which projects from the guide member 10, and a headstock bracket 15 having a tubular socket 16 into which the closed end of the guide member 10 fits. The headstock bracket 15 includes a flange apertured to receive bolts securing the buffer to a buffer beam or like support on a vehicle. The tubular stem 13 has an integral end wall 17 at its inner end, the said wall 17 being apertured for the passage of a metering pin 18 having a head 19 lying inside the stem 13, the other end of the pin 18 being adapted to pass through a hole 21 in the wall 11 and having a screw-threaded portion to receive a nut 22 holding it in position in the guide member. A fluid-tight floating piston 23 is slidable in the stem 13, dividing its interior into two chambers 24 and 25.

The space in the guide member 10 between the end wall 11 thereof and the adjacent end of the stem 13 is filled with liquid as is also the chamber 25 in the stem. The chamber 24 in the stem is filled with air under pressure, the pressure of the said air, acting through the floating piston on the liquid, tending to extend the buffer until the head 19 on the metering pin engages the end wall 17 of the stem. The guide member 10 and stem 13 thus constitute respectively the cylinder and plunger of an oleo-pneumatic shock absorbing unit. Leakage of liquid between the guide member 10 and the stem 13 is prevented by primary and secondary packing means 26 and 27 adjacent the inner end of the stem, the stem carrying, between the said packing means, a bearing sleeve 28.

The guide member 10 is formed, close to its open end 12, with a narrow internal circumferential groove 29 separated by a narrow land 31 from a much wider circumfgerential groove 32 having its side walls 33 of frusto-conical form as shown. The land 31 lies on a circle having a diameter greater than that of the main bore of the guide member 10, and the further land 34, between the groove 29 and the open end 12 of the guide member, lies on a circle of still greater diameter.

The stem 13 has a reduced portion 35 near its inner end, a frusto-conical portion 36 being interposed between the reduced portion 35 and the full-diameter portion of the stem.

When the buffer is assembled, the grooves 29 and 32 accommodate respectively a scraper ring 37 and a bearing sleeve 38, both of which are thus held against longitudinal movement relative to the guide member 10. Both the scraper ring 37 and the bearing sleeve 38 are split, and are resilient the gaps in them being such that they can be contracted sufficiently to pass, as regards the sleeve 38 through the land 31, and, as regards the ring 37, through the land 34. The reduced portion 35 of the stem 13 is small enough to allow the sleeve 38 and ring 37, when they are mounted on it, to assume their contracted conditions.

Thus the buffer can be assembled by first mounting the sleeve 38 and ring 37 on the reduced portion of the stem 13 (as shown in Figure 2), and then inserting the stem in the guide. The sleeve 38 and ring 37 move into the guide with the stem until they are opposite to their respective grooves, and are then stopped by the inner side walls of the respective grooves. Continued inward movement of the stem causes first the ring 37 and then the sleeve 38 to slide up the frusto-conical surface of the stem on to the full-diameter portion thereof, the ring 37 and sleeve 38 being thus expanded into their respective grooves. The stem is retained in the guide member by the metering pin 18, which has been previously assembled with the stem, and is secured to the guide member by the nut 22.

The scraper ring 37, as shown, preferably has its internal surface inclined transversely so as to present a scraping edge at its side nearer the buffer head, and is held against rotation in the guide member 10 by a set screw 39 passing radially inwardly through the guide member at the lowest point of the latter and entering the gap in the ring. The gap in the ring is thus retained in the most favourable position, where foreign matter is least likely to collect on the surface of the stem, and where it allows the free escape of any water which may pass the scraper ring. The scraper ring is preferably formed of resilient metal, and has a free diameter substantially smaller than the diameter of the stem, so that it will continue to exert a scraping action after a considerable degree of wear.

The bearing sleeve 38 may be formed of nylon or other synthetic thermoplastic material or materials such as are used for brake linings, or of Phosphor bronze or other suitable metal.

The invention is not limited to constructions in which both a scraper ring and a bearing sleeve are used, but is applicable to constructions in which either is used separately.

Where both a scraper ring and a bearing sleeve are used, the bearing sleeve, instead of being contained in a groove in the guide, may be contained in an enlarged portion of the bore of the guide extending up to the inner wall of the groove housing the scraper ring, the scraper ring then acting as a retainer for the bush.

Whilst the invention has been particularly described with reference to an oleo-pneumatic buffer, it may also be applied to spring buffers with or without liquid damping, and to shock absorber units for incorporation in draft couplings, such shock absorber units corresponding substantially to the guide member and stem of the buffer without the buffer head or head stock bracket.

I claim:

1. A buffer or equivalent shock absorbing unit for a railway, tramway or like vehicle comprising a tubular guide member having an open end and a closed end, said guide member adjacent the open end having an internal circumferential groove, a split annular member fitted within the groove, a stem extending through the annular member into the guide member, a stop carried by the guide member for locating the annular member in position in the groove, the stem being formed with a portion of reduced diameter which, when the buffer is assembled, remains permanently on the side of said groove toward the closed end of the guide member, the said stem having a portion of uniform, full diameter and said portion of reduced diameter being connected to the full diameter portion of the stem projecting from the guide member by a frusto-conical portion, said portion of reduced diameter having the annular member loosely circumposed thereon in assembling the unit and being of a diameter so that the annular member when mounted thereon can pass through the tubular guide up to the stop and engages the stop locating it opposite its groove, the tubular member being expanded into the groove by further inward movement of the stem and the full diameter portion of the stem being opposite the groove when the unit is assembled and being of a uniform diameter such that the split annular member is retained in the groove.

2. A buffer or equivalent shock absorbing unit according to claim 1, wherein the groove in the guide which receives the split annular member is bounded at its side nearer to the open end of the guide by a wall of less depth than that at its other side, so that the split annular member, when engaging the reduced portion of the stem, passes freely into the guide until it comes opposite to its groove, and is stopped by the deeper wall thereof.

3. A buffer or equivalent shock absorbing unit for a railway, tramway or like vehicle comprising a tubular guide member having an open end portion provided with internal circumferential grooves, a scraper ring and a bearing sleeve, said ring and sleeve being split annular members and each being accommodated in its circumferential groove in the guide member, a stem extending through the scraper ring and the bearing sleeve into the guide member, stop means carried by the guide member for locating the scraper ring and the bearing sleeve in place in its groove, the stem being formed with a portion of reduced diameter which, when the buffer is assembled, remains permanently on the inner side of said grooves, the said stem having a portion of uniform, full diameter and said portion of reduced diameter being connected to the full-diameter portion of the stem which projects from the guide member by a frusto-conical portion, so that the scraper ring and bearing sleeve can be assembled on the reduced-diameter portion of the stem, and inserted into the guide whilst in that position until each of them engages the stop means locating it opposite its groove, the said scraper ring and bearing sleeve being then expanded into their respective grooves by further inward movement of the stem, the full diameter portion of the stem being of uniform diameter and being opposite the grooves when the unit is assembled so that the scraper ring and bearing sleeve are retained in their respective grooves.

4. A buffer or equivalent shock absorbing unit according to claim 3, wherein the scraper ring is mounted between the bearing sleeve and the end of the open end portion of the guide member with the grooves being spaced axially apart, the land between the grooves receiving the bearing sleeve and the scraper ring respectively lying on a circle having a diameter greater than that of the main bore of the guide, and the land between the scraper ring groove and the end of the open end portion of the guide member lying on a circle of still greater diameter.

5. A buffer or equivalent shock absorbing unit according to the claim 4, wherein the scraper ring is held against rotation in its groove by a set screw extending inwardly through the guide into the gap in said ring, the set screw being positioned on the underside of the buffer.

References Cited in the file of this patent

UNITED STATES PATENTS

| | | |
|---|---|---|
| 1,379,041 | Pulliam | May 24, 1921 |
| 2,195,552 | Alexandrescu | Apr. 2, 1940 |
| 2,390,445 | Mercier | Dec. 4, 1945 |
| 2,635,932 | Heusser | Apr. 21, 1953 |